US012812727B2

(12) United States Patent
Hayashi et al.

(10) Patent No.: US 12,812,727 B2
(45) Date of Patent: Nov. 24, 2026

(54) RADIO TERMINAL AND METHOD THEREFOR

(71) Applicant: NEC Corporation, Tokyo (JP)

(72) Inventors: Satoaki Hayashi, Tokyo (JP); Sadafuku Hayashi, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 18/572,988

(22) PCT Filed: Jun. 29, 2022

(86) PCT No.: PCT/JP2022/026019
§ 371 (c)(1),
(2) Date: Dec. 21, 2023

(87) PCT Pub. No.: WO2023/277079
PCT Pub. Date: Jan. 5, 2023

(65) Prior Publication Data

US 2024/0298379 A1 Sep. 5, 2024

(30) Foreign Application Priority Data

Jun. 29, 2021 (JP) ................................ 2021-107507

(51) Int. Cl.
*H04W 76/28* (2018.01)

(52) U.S. Cl.
CPC .................................. *H04W 76/28* (2018.02)

(58) Field of Classification Search
None
See application file for complete search history.

(56) References Cited

U.S. PATENT DOCUMENTS

| | | | | |
|---|---|---|---|---|
| 2021/0267008 | A1* | 8/2021 | Dutta | H04W 76/28 |
| 2022/0304103 | A1* | 9/2022 | Cheng | H04W 76/14 |
| 2022/0322486 | A1* | 10/2022 | Park | H04W 4/08 |
| 2023/0247553 | A1 | 8/2023 | Zheng et al. | |
| 2023/0380000 | A1* | 11/2023 | Lee | H04W 76/27 |

(Continued)

FOREIGN PATENT DOCUMENTS

| | | | |
|---|---|---|---|
| WO | 2015/174327 | A1 | 11/2015 |
| WO | 2022/083635 | A1 | 4/2022 |

OTHER PUBLICATIONS

ETSI TS 138 331 V17.0.0 (May 2022), Technical Specification; 5G; N R (Year: 2022).*

(Continued)

*Primary Examiner* — Hassan A Phillips
*Assistant Examiner* — Gautam Sharma
(74) *Attorney, Agent, or Firm* — Sughrue Mion, PLLC

(57) ABSTRACT

A radio terminal (1B) negotiates a DRX configuration with a peer terminal (1A) for reception by the radio terminal (1B) of a unicast communication on a direct interface between the radio terminal (1B) and the peer terminal (1A). The radio terminal (1B) indicates to the peer terminal (1A), while the DRX configuration has been negotiated and is valid, whether or not the radio terminal (1B) performs a DRX operation based on the valid DRX configuration in order to receive the unicast communication. This can help, for example, to prevent an increase in the signaling load on the radio terminal with respect to DRX for device-to-device (D2D) communication.

6 Claims, 8 Drawing Sheets

(56) References Cited

U.S. PATENT DOCUMENTS

| | | | | |
|---|---|---|---|---|
| 2024/0064857 | A1* | 2/2024 | Wang | H04W 76/10 |
| 2024/0298379 | A1* | 9/2024 | Hayashi | H04W 76/28 |

OTHER PUBLICATIONS

International Search Report for PCT Application No. PCT/JP2022/026019, mailed on Sep. 27, 2022.
InterDigital Inc., Apple, Huawei, "On TX Centric vs RX Centric Approaches for DRX Configuration Determination", R2-2104867, 3GPP TSG-RAN WG2 Meeting #114-e, May 19-27, 2021, pp. 1-4.
ZTE Corporation, Sanechips, "Discussion on SL DRX configuration", R2-2105077, 3GPP TSG-RAN WG2 Meeting #114-e, May 19-27, 2021, pp. 1-7.
Huawei, HiSilicon, "Consideration on the sidelink DRX for unicast", R2-2105083, 3GPP TSG-RAN WG2 Meeting #114-e, May 19-27, 2021, pp. 1-11.
Apple, "Discussion on remaining issues of SL DRX", R2-2105132, 3GPP TSG-RAN WG2 Meeting #114-e, May 19-27, 2021, pp. 1-7.
ZTE, "[AT113bis-e][708][V2X/SL] DRX configuration for SL groupcast and broadcast", R2-2105912, 3GPP TSG-RAN WG2 Meeting #114-e, May 19-27, 2021, pp. 1-21.
Sharp, "Discussion on co-existence with UEs not supporting SL DRX", R2-2105277, 3GPP TSG-RAN WG2 Meeting #114-e, May 19-27, 2021, pp. 1-2.
InterDigital Inc., "Procedures for Handling the DRX Configuration",3GPP TSG RAN WG2 #113-e_R2-2100515, Jan. 15, 2021, pp. 1-4.
Ericsson, "General aspects for SL DRX", 3GPP TSG RAN WG2 #113-e_R2-2100536, Jan. 14, 2021, pp. 1-6.
JP Office Action for JP Application No. 2023-532028, mailed on May 20, 2025 with English Translation.
Ericsson, "Remaining aspects of SL DRX", 3GPP TSG RAN WG2 #114-e R2-2105493, May 10, 2021.

* cited by examiner

RADIO TERMINAL AND METHOD THEREFOR

This application is a National Stage Entry of PCT/JP2022/026019 filed on Jun. 29, 2022, which claims priority from JP Patent Application 2021-107507 filed on Jun. 29, 2021, the contents of all of which are incorporated herein by reference, in their entirety.

TECHNICAL FIELD

The present disclosure relates to direct communication between radio terminals (device-to-device (D2D) communication), in particular to discontinuous reception (DRX) performed by a radio terminal receiving a D2D communication.

BACKGROUND ART

The mode in which a radio terminal communicates directly with another radio terminal, without the need for an infrastructure network such as a base station, is commonly referred to as device-to-device (D2D) communication. D2D communications can be integrated with or assisted by a cellular network. Proximity-based services (ProSe), specified in the Third Generation Partnership Project (3GPP (registered trademark)) Release 12 and beyond, provide a system architecture for D2D communications assisted by a cellular network. In addition, cellular Vehicle-to-Everything (V2X) services, specified in 3GPP Release 14 and beyond, refer to ProSe and use D2D communications between radio terminals. D2D communications assisted by a cellular network can also be used for other applications and services (e.g., public safety applications) in addition to V2X services.

The interface between 3GPP radio terminals (i.e., User Equipments (UEs)) used in the control and user planes for D2D communications is called the PC5 interface (or reference point). The PC5 interface can be based on Evolved Universal Terrestrial Radio Access (E-UTRA) sidelink capability and can also be based on 5G New Radio (NR) sidelink capability. D2D communications over the PC5 interface are referred to as sidelink communications. D2D communications (or sidelink communications) over the E-UTRA-PC5 (or Long Term Evolution (LTE) based PC5) interface are connectionless, i.e., broadcast mode at the Access Stratum (AS) layer. In contrast, user-plane communications over the NR PC5 interface support unicast mode, groupcast mode and broadcast mode at the AS layer.

To support various V2X and public safety use cases, the 3GPP RAN Working Group is currently developing a standard specification for the Release 17 NR sidelink enhancement. One of the objectives of this study item is to support discontinuous reception (DRX) on the sidelink (see, for example, Non-Patent Literature 1-6). Currently, the following are agreed upon. For DRX configuration for each direction where one UE is the Tx-UE and the other as the Rx-UE, NR sidelink unicast supports signaling exchanges including both signaling from the Rx-UE to the Tx-UE and signaling from the Tx-UE to the Rx-UE. Tx-UE centric DRX configuration determination based on assistance information from the Rx-UE is the baseline for NR sidelink unicast.

In the Tx-UE centric DRX configuration determination, the Rx-UE sends assistance information to the Tx-UE and the Tx-UE makes the final decision on the DRX configuration, taking into account the assistance information. The assistance information sent by the Rx-UE may include, for example, information on power savings, e.g., one or both of preferences and constraints. The assistance information may include the current DRX configurations for one or more other SL connections. More specifically, to enable the Tx-UE to make decisions on behalf of the Rx-UE, the assistance information may include a set of DRX configurations for all links to which the Rx-UE has already been configured with DRX.

In contrast, in the Rx-UE centric DRX configuration determination, the Tx-UE sends assistance information to the Rx-UE and the Rx-UE makes the final decision on the DRX configuration while taking into account the assistance information. The assistance information sent by the Tx-UE may include the traffic pattern of the Tx-UE and may include one or more candidate DRX configurations that would allow the Tx-UE to meet the latency requirements of the Tx-UE with a given traffic pattern.

CITATION LIST

Non Patent Literature

[Non-Patent Literature 1] InterDigital Inc., Apple, Huawei, "On TX Centric vs RX Centric Approaches for DRX Configuration Determination", R2-2104867, 3GPP TSG-RAN WG2 Meeting #114-e, May 19-27, 2021

[Non-Patent Literature 2] ZTE Corporation, Sanechips, "Discussion on SL DRX configuration", R2-2105077, 3GPP TSG-RAN WG2 Meeting #114-e, May 19-27, 2021

[Non-Patent Literature 3] Huawei, HiSilicon, "Consideration on the sidelink DRX for unicast", R2-2105083, 3GPP TSG-RAN WG2 Meeting #114-e, May 19-27, 2021

[Non-Patent Literature 4] Apple, "Discussion on remaining issues of SL DRX", R2-2105132, 3GPP TSG-RAN WG2 Meeting #114-e, May 19-27, 2021

[Non-Patent Literature 5] ZTE, "[AT113bis-e][708][V2X/SL] DRX configuration for SL groupcast and broadcast", R2-2105912, 3GPP TSG-RAN WG2 Meeting #114-e, May 19-27, 2021

[Non-Patent Literature 6] SHARP, "Discussion on co-existence with UEs not supporting SL DRX", R2-2105277, 3GPP TSG-RAN WG2 Meeting #114-e, May 19-27, 2021

SUMMARY OF INVENTION

Technical Problem

The inventors have studied DRX in D2D communications (e.g., NR sidelink unicast) and found various problems. One of these problems relates to the temporary suspension and (re)start of DRX operation based on a valid DRX configuration.

Specifically, a UE (i.e., Rx-UE) may receive multiple sidelink communications (or transmissions) from multiple UEs (i.e., Tx-UEs). These multiple sidelink communications may include unicast communications, groupcast communications, broadcast communications, or any combination thereof. The UE (i.e., Rx-UE) may be configured by or negotiate with the respective transmitting UEs (Tx-UEs) multiple DRX configurations for the respective sidelink transmissions. Then, considering the multiple DRX configurations, the UE (i.e., Rx-UE) may not (actually) be able to perform DRX operations or may not need to perform DRX operations. However, this situation is considered to be temporary. The UE (i.e., Rx-UE) may be able to resume DRX operations when some sidelink communications have been terminated. In this case, if the UE (i.e., Rx-UE) has to reconfigure, redetermine and renegotiate the DRX configurations for one or more sidelink unicasts, this may result in an increased signaling load on the UE (i.e., Rx-UE). On the other hand, if the UE (i.e., Rx-UE) is able to inform the corresponding Tx-UEs that the UE (i.e., Rx-UE) is (virtually) not performing DRX operations although the DRX configurations for one or more sidelink unicasts have been negotiated and are valid, this may contribute to increasing the transmission opportunities of the Tx-UEs.

From another perspective, it may be desirable to allow the Tx-UE to temporarily transmit additional data or signaling to the Rx-UE while the DRX configuration for sidelink unicast has been negotiated and is valid. To enable this, the Tx-UE and the Rx-UE may need to reconfigure, redetermine or renegotiate the current DRX configuration, which may increase the signaling load on the Tx-UE and Rx-UE.

One of the objects to be accomplished by example embodiments disclosed herein is to provide apparatuses, methods, and programs that contribute to solving at least one of a plurality of problems, including the problems described above. It should be noted that this object is merely one of the objects to be achieved by the example embodiments disclosed herein. Other objects or problems and novel features will be made apparent from the following description and the accompanying drawings.

Solution to Problem

In a first aspect, a radio terminal includes at least one radio transceiver and at least one processor coupled to the at least one radio transceiver. The at least one processor is configured to negotiate a discontinuous reception (DRX) configuration with a peer terminal for reception by the radio terminal of a unicast communication on a direct interface between the radio terminal and the peer terminal. The at least one processor is configured to indicate to the peer terminal, while the DRX configuration has been negotiated and is valid, whether or not the radio terminal performs a DRX operation based on the valid DRX configuration in order to receive the unicast communication.

In a second aspect, a radio terminal includes at least one radio transceiver and at least one processor coupled to the at least one radio transceiver. The at least one processor is configured to negotiate a discontinuous reception (DRX) configuration with a peer terminal for reception by the peer terminal of a unicast communication on a direct interface between the radio terminal and the peer terminal. The at least one processor is configured to receive from the peer terminal, while the DRX configuration has been negotiated and is valid, first information indicating whether or not the peer terminal performs a DRX operation based on the valid DRX configuration to receive the unicast communication.

In a third aspect, a method performed by a radio terminal includes: (a) negotiating a discontinuous reception (DRX) configuration with a peer terminal for reception by the radio terminal of a unicast communication on a direct interface between the radio terminal and the peer terminal; and (b) indicating to the peer terminal, while the DRX configuration has been negotiated and is valid, whether or not the radio terminal performs a DRX operation based on the valid DRX configuration in order to receive the unicast communication.

In a fourth aspect, a method performed by a radio terminal includes: (a) negotiating a discontinuous reception (DRX) configuration with a peer terminal for reception by the peer terminal of a unicast communication on a direct interface between the radio terminal and the peer terminal; and (b) receiving from the peer terminal, while the DRX configuration has been negotiated and is valid, first information indicating whether or not the peer terminal performs a DRX operation based on the valid DRX configuration to receive the unicast communication.

In a fifth aspect, a radio terminal includes at least one radio transceiver and at least one processor coupled to the at least one radio transceiver. The at least one processor is configured to negotiate a discontinuous reception (DRX) configuration with a peer terminal for reception by the radio terminal of a unicast communication on a direct interface between the radio terminal and the peer terminal. The at least one processor is configured to receive from the peer terminal, while the DRX configuration has been negotiated and is valid, first information indicating whether or not the radio terminal is allowed to perform a DRX operation based on the valid DRX configuration in order to receive the unicast communication.

In a sixth aspect, a radio terminal includes at least one radio transceiver and at least one processor coupled to the at least one radio transceiver. The at least one processor is configured to negotiate a discontinuous reception (DRX) configuration with a peer terminal for reception by the peer terminal of a unicast communication on a direct interface between the radio terminal and the peer terminal. The at least one processor is configured to indicate to the peer terminal, while the DRX configuration has been negotiated and is valid, whether or not the peer terminal is allowed to perform a DRX operation based on the valid DRX configuration in order to receive the unicast communication.

In a seventh aspect, a method performed by a radio terminal includes: (a) negotiating a discontinuous reception (DRX) configuration with a peer terminal for reception by the radio terminal of a unicast communication on a direct interface between the radio terminal and the peer terminal; and (b) receiving from the peer terminal, while the DRX configuration has been negotiated and is valid, first information indicating whether or not the radio terminal is allowed to perform a DRX operation based on the valid DRX configuration in order to receive the unicast communication.

In an eighth aspect, a method performed by a radio terminal includes: (a) negotiating a discontinuous reception (DRX) configuration with a peer terminal for reception by the peer terminal of a unicast communication on a direct interface between the radio terminal and the peer terminal; and (b) indicating to the peer terminal, while the DRX configuration has been negotiated and is valid, whether or not the peer terminal is allowed to perform a DRX operation based on the valid DRX configuration in order to receive the unicast communication.

A ninth aspect is directed to a program. The program includes a set of instructions (software codes) that, when loaded into a computer, cause the computer to perform the method according to the third, fourth, seventh, or eighth aspect described above.

Advantageous Effects of Invention

According to the aspects described above, it is possible to provide apparatuses, methods and programs that contribute to solving at least one of a plurality of problems related to DRX for D2D communication.

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be appropriately combined with one another. These example embodiments include novel features different from each other. Accordingly, these example embodiments contribute to attaining objects or solving problems different from one another and contribute to obtaining advantages different from one another.

The example embodiments presented below are primarily described for the 3GPP 5th generation mobile communication system (5G system). However, these example embodiments can be applied to other radio communication systems that support D2D communication technology similar to 3GPP NR sidelink communication.

As used in this specification, “if” can be interpreted to mean “when”, “at or around the time”, “after”, “upon”, “in response to determining”, “in accordance with a determination”, or “in response to detecting”, depending on the context.

First Example Embodiment

Figure 1:
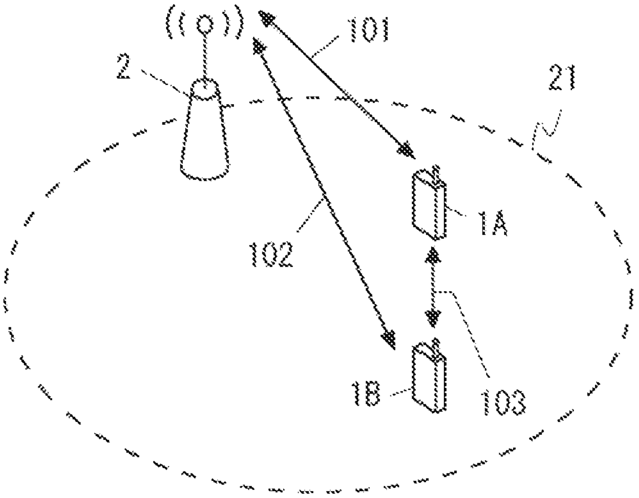
FIG. 1 shows an example configuration of a radio communication system according to an example embodiment.

FIG. 1 shows an example configuration of a radio communication system according to a plurality of example embodiments, including the present example embodiment. A Radio Access Network (RAN) node (e.g., gNB) 2 manages a cell 21 and is capable of performing cellular communications (101 and 102) with a plurality of radio terminals (UEs) 1, including UEs 1A and UE 1B, using a cellular communication technology (i.e., NR Radio Access Technology). The example in FIG. 1 shows a situation where the UEs 1A and 1B are located in the same cell 21 for ease of explanation, but such an arrangement is only an example. For example, the UE 1A may be located in one of two adjacent cells managed by different RAN nodes 2, and the UE 1B may be located in the other cell. Alternatively, at least one of the UE 1A and the UE 1B may be located outside the coverage of one or more RAN nodes 2 (i.e., partial coverage, out-of-coverage).

Each of the UE 1A and the UE 1B has at least one radio transceiver and is configured to perform cellular communication (101 or 102) with the RAN node 2 and to perform D2D communication (i.e., sidelink communication) on a direct inter-UE interface (i.e., NR PC5 interface or NR sidelink) 103. The sidelink communication includes unicast mode communication (sidelink unicast) and may further include one or both of groupcast mode communication and broadcast mode communication.

Figure 2:
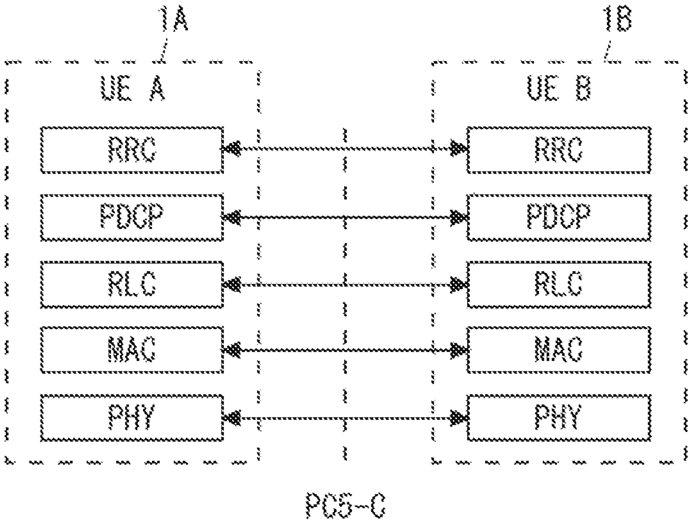
FIG. 2 shows an AS protocol stack of a control plane for RRC on the PC5 interface.
Figure 3:
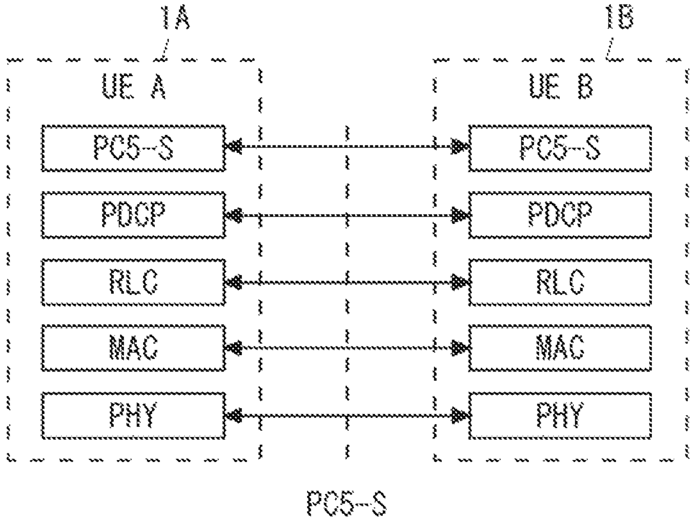
FIG. 3 shows an AS protocol stack of a control plane for PC5-S on the PC5 interface.
Figure 4:
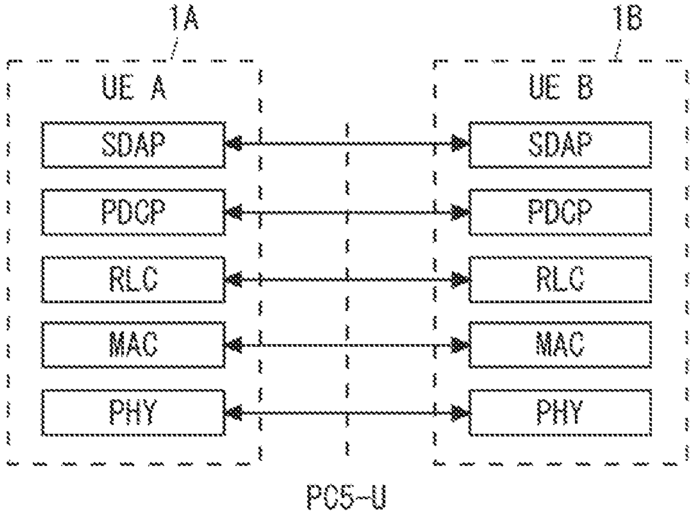
FIG. 4 shows an AS protocol stack of a user plane on the PC5 interface.

FIGS. 2, 3, and 4 show the AS protocol stacks of the PC5 interface 103. As shown in FIG. 2, the AS protocol stack of the control plane for the Sidelink Control Channel (SCCH) for RRC includes the RRC, Packet Data Convergence Protocol (PDCP), Radio Link Control (RLC), and MAC sublayers, as well as the Physical (PHY) layer. The SCCH is a sidelink logical channel for the transmission of control information (i.e., PC5-RRC and PC5-S messages) from one UE to another UE(s).

The PC5 interface 103 supports the PC5 Signaling (PC5-S) protocol. As shown in FIG. 3, PC5-S sits on top of the PDCP, RLC, and MAC sublayers and the physical layer in the AS protocol stack of the control plane for SCCH for PC5-S. PC5-S is used for control plane signaling over the PC5 interface 103 for a secure unicast Layer-2 link (or PC5 unicast link). Specifically, PC5-S provides signaling to establish, modify, and release the PC5 unicast link. The PC5 unicast link between the UE 1A and the UE 1B is associated with the Application Layer ID and Layer-2 ID of the UE 1A and the Application Layer ID and Layer-2 ID of the UE 1B. The PC5 unicast link is bidirectional. Therefore, the UE 1A can send application data (e.g., V2X service data, public safety service data) to the UE 1B over the PC5 unicast link with the UE 1B, while the UE 1B can also send application data to the UE 1A over the same PC5 unicast link.

There is a one-to-one correspondence between the PC5 unicast link and the PC5-RRC connection. The PC5-RRC connection is a logical connection between two UEs 1 for a pair of a Source Layer-2 ID and a Destination Layer-2 ID. The PC5-RRC connection is considered to be established after the corresponding PC5 unicast link is established. In other words, the PC5-RRC connection is established in response to the establishment of its corresponding PC5 unicast link. Specifically, when the transmission of a PC5-S message to a specific destination is requested by the upper layers of a sidelink signaling radio bearer (SRB), the UE 1 (RRC layer) establishes a PDCP entity, an RLC entity, and a logical channel (Sidelink Control Channel (SCCH)) of the sidelink SRB for the PC5-S message, based on a predefined SCCH configuration, and then considers a PC5-RRC connection to be established for the destination. Alternatively, if the establishment of a PC5-RRC connection for a specific destination is indicated by the upper layers, the UE 1 (RRC layer) establishes a PDCP entity, an RLC entity, and a logical channel (SCCH) of a sidelink SRB for the PC5-RRC message, and then considers this PC5-RRC connection to be established.

FIG. 4 shows the AS user plane protocol stack for the Sidelink Traffic Channel (STCH). The STCH is a sidelink logical channel for the transmission of user data (e.g., V2X service data) from one UE to another UE(s). This protocol stack includes the Service Data Adaptation Protocol (SDAP), PDCP, RLC, and MAC sublayers, and the PHY layer.

Figure 5:
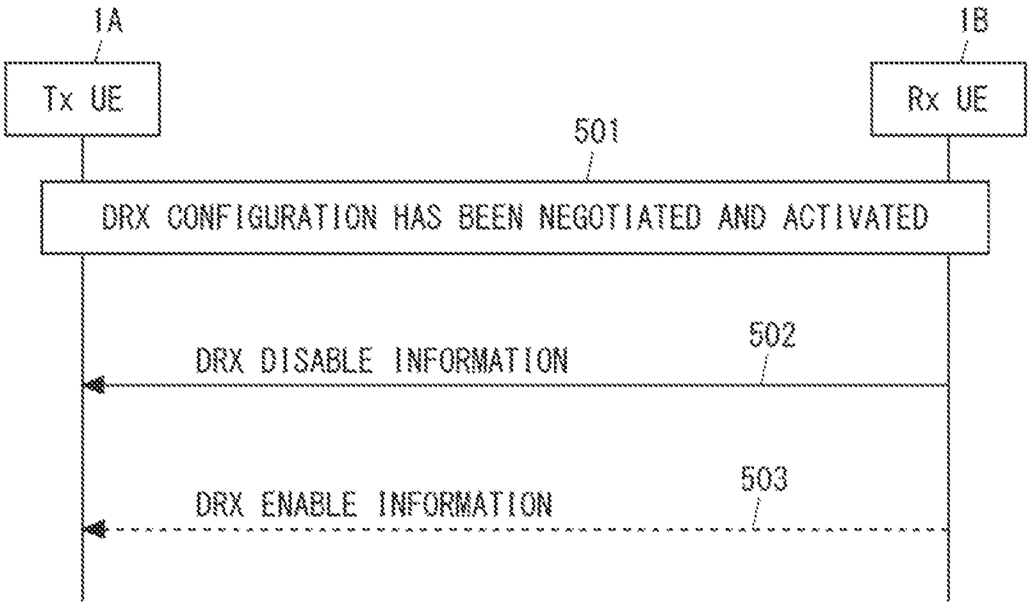
FIG. 5 shows an example of signaling between UEs according to an example embodiment.

The following describes a specific example of signaling related to DRX performed by the UE 1B to receive a unicast communication (transmission) sent by the UE 1A, with reference to FIG. 5. For ease of explanation, the UE 1A will be referred to as the transmitting UE (Tx-UE) and the UE 1B will be referred to as the receiving UE (Rx-UE). As already explained, the PC5 unicast link is bidirectional, so that the UE 1B can also send user data and signaling to the UE 1A over this PC5 unicast link. Therefore, the signaling and operation described below can also be used for DRX performed by the UE 1A to receive a unicast communication (transmission) sent by the UE 1B.

In step 501, the Tx-UE 1A and the Rx-UE 1B negotiate a DRX configuration for the Rx-UE 1B to receive a unicast communication from the Tx-UE 1A. In other words, the Tx-UE 1A and the Rx-UE 1B determine a DRX configuration for the Rx-UE 1B to receive a unicast communication from the Tx-UE 1A. To negotiate (or determine) the DRX configuration, the Tx-UE 1A and the Rx-UE TB may exchange signaling messages in both directions. The Tx-UE 1A and the Rx-UE 1B may perform the negotiation (or determination) of the DRX configuration via RRC layer signaling (e.g., PC5 RRC messages).

This negotiation (or determination) of the DRX configuration may be performed in a Tx-UE centric manner or in an Rx-UE centric manner. In the Tx-UE centric DRX configuration determination, the Rx-UE 1B sends assistance information to the Tx-UE 1A and the Tx-UE 1A makes the final decision on the DRX configuration while taking into account the assistance information. The assistance information sent by the Rx-UE 1B may include, for example, information on power savings, e.g., one or both of preferences and constraints. The assistance information may include the current DRX configurations for one or more other SL connections. More specifically, to enable the Tx-UE 1A to make decisions on behalf of the Rx-UE 1B, the assistance information may include a set of DRX configurations for all links to which the Rx-UE 1B has already been configured with DRX.

In contrast, in the Rx-UE centric DRX configuration determination, the Tx-UE 1A sends assistance information to the Rx-UE 1B and the Rx-UE 1B makes the final decision on the DRX configuration while taking into account the assistance information. The assistance information sent by the Tx-UE 1A may include the traffic pattern of the Tx-UE 1A and may include one or more candidate DRX configurations that would allow the Tx-UE 1A to meet the latency requirements of the Tx-UE 1A with a given traffic pattern.

In step 501, after negotiating the DRX configuration, the Tx-UE 1A and Rx-UE 1B initially activate this valid DRX configuration. Activating the DRX configuration can be paraphrased as enabling the DRX configuration or turning on the DRX configuration. Accordingly, the Tx-UE 1A performs the unicast transmission to the Rx-UE 1B according to the valid DRX configuration for this unicast transmission. The Rx-UE 1B receives the unicast transmission from the Tx-UE 1A according to this valid DRX configuration.

As is well known, DRX follows a DRX cycle that includes an ON duration and an OFF duration. The length of the DRX cycle is the sum of the ON duration and the OFF duration. The DRX configuration contains at least information to identify the DRX cycle and the ON (or OFF) duration. When the DRX configuration is activated, the Rx-UE 1B will attempt to receive unicast transmissions from the Tx-UE 1A for at least the ON duration, and need not do so for the OFF duration. The OFF duration can be rephrased as an opportunity for DRX. The ON duration may be the period of time during which the UE waits to receive a Physical Sidelink Control Channel (PSCCH) (and Physical Sidelink Shared Channel (PSSCH)). The PSCCH carries physical layer sidelink control information (SCI). The SCI (e.g., SCI format 1) can be referred to as a Scheduling Assignment (SA) for PSSCH transmission. The PSSCH transmits a transport channel (i.e., Sidelink shared channel (SL-SCH)) that carries a transport block into which the SCCH or STCH is mapped. The PSCCH is transmitted in the same subframe as the associated PSSCH.

In step 502, the Rx-UE 1B indicates, while the DRX configuration for the unicast transmission from the Tx-UE 1A has been negotiated and is valid, if necessary, whether or not the Rx-UE TB performs the DRX operation based on this valid DRX configuration to receive this unicast communication from the Tx-UE 1A. Specifically, in the example shown in FIG. 5, the Rx-UE 1B sends DRX disable information to the Tx-UE 1A indicating that the DRX operation for the unicast communication based on the valid DRX configuration is temporarily suspended. The DRX disable information can be rephrased as, for example, DRX deactivation information, DRX OFF information, DRX suspension information, or DRX pause information.

In response to the transmission of the DRX disable information (502), the Rx-UE 1B temporarily stops (or suspends, pauses) the DRX operation for the unicast transmission from the Tx-UE 1A. In other words, the Rx-UE 1B attempts to receive on radio resources (e.g., subframes, subchannels, resource blocks) that could be used for the unicast transmission from the Tx-UE 1A, even during the OFF duration of the valid DRX configuration.

In an example, the Rx-UE 1B may manage multiple valid DRX configurations for the respective receptions of multiple sidelink communications, including the unicast communication from the Tx-UE 1A. In this case, given the multiple DRX configurations, the Rx-UE 1B may not (actually) be able to perform DRX operations or may not need to perform DRX operations. Therefore, if the Rx-UE 1B is substantially unable or does not need to perform the DRX operation considering the multiple valid DRX configurations, the Rx-UE 1B may send the DRX disable information to the Tx-UE 1A.

Specifically, in addition to the above unicast communication from the Tx-UE 1A, the multiple sidelink communication may include one or more unicast communications, one or more groupcast communications, one or more broadcast communications, or any combination thereof. The multiple sidelink communication may include another unicast communication from the Tx-UE 1A. This may be, for example, a unicast communication for sidelink QoS flow(s) with a Quality of Service (QoS) profile different from that of the sidelink QoS flow(s) transmitted in the aforementioned unicast communication. The Rx-UE 1B may perform DRX operations based on the multiple DRX configurations as follows. For example, the RRC layer of the Rx-UE 1B may configure one or both of the MAC and PHY layers for DRX operations based on the multiple DRX configurations. Alternatively, the MAC layer of the Rx-UE 1B may receive the multiple DRX configurations from the RRC layer and control the PHY layer to perform DRX operations based on these multiple DRX configurations. If the Rx-UE 1B cannot or does not need to perform DRX operations substantially in view of the multiple valid DRX configurations, the Rx-UE 1B may send the DRX disable information to the Tx-UE 1A.

In response to receiving the DRX disable information (502), the Tx-UE 1A recognizes that the Rx-UE 1B will not perform the DRX operation based on the valid DRX configuration, but will perform a continuous receive operation. In an example, the Tx-UE 1A may transmit to the Rx-UE 1B even during the OFF duration of the valid DRX configuration. This could contribute to increasing the transmission opportunities for the Tx-UE 1A.

The transmission of the DRX disable information (502) and the operation of the Tx-UE 1A and Rx-UE 1B based on this information can provide the following benefits. First, it can help to avoid an increased load on the Rx-UE TB (as well as on the Tx-UE 1A and other Tx-UE(s)). For example, given the multiple DRX configurations for receiving multiple sidelink communications, the Rx-UE 1B may not actually be able to perform DRX operations or may not need to perform DRX operations. However, this situation is considered to be temporary. The Rx-UE 1B may be able to resume DRX operations when some sidelink communications have been terminated. In this case, if the Rx-UE 1B has to reconfigure, redetermine, and renegotiate one or more DRX configurations for one or more unicast communications, including the unicast communication from the Tx-UE 1A, this could result in an increased load on the Rx-UE 1B (as well as on the Tx-UE 1A and other Tx-UE(s)). In contrast, the transmission of the DRX disable information (502) and the operation of the Tx-UE 1A and Rx-UE 1B based on this information can enable the Rx-UE 1B (and the Tx-UE 1A and other Tx-UE(s)) not to reconfigure, redetermine, or renegotiate DRX configurations.

Second, as noted above, it may help to increase the transmission opportunities for the Tx-UE 1A. For example, the Tx-UE 1A can transmit to the Rx-UE 1B even during the OFF duration of the valid DRX configuration.

The Rx-UE 1B may send the DRX disable information (502) via RRC layer signaling (e.g., PC5 RRC message). Alternatively, the Rx-UE 1B may send the DRX disable information (502) via MAC layer signaling (e.g., MAC control element (CE)). Alternatively, the Rx-UE 1B may send the DRX disable information (502) via PHY layer signaling.

As shown in step 503 of FIG. 5, after sending the DRX disable information (502), the Rx-UE 1B may, if necessary, send DRX enable information to the Tx-UE 1A indicating that the DRX operation based on the valid DRX configuration is to be resumed. For example, when the Rx-UE 1B again enters a situation where it can perform the DRX operation, the Rx-UE 1B may send the DRX enable information (503). The DRX enable information may be paraphrased as, for example, DRX activation information, DRX ON information, or DRX resumption information. In response to the transmission of the DRX enable information (503), the Rx-UE 1B reactivates the valid DRX configuration and receives the unicast transmission from the Tx-UE 1A according to the valid DRX configuration. Meanwhile, upon receipt of the DRX enable information (503), the Tx-UE 1A performs the unicast transmission to the Rx-UE TB according to the valid DRX configuration for that unicast transmission.

In some implementations, the transmission of the DRX enable information (503) may be omitted. For example, the Rx-UE 1B may start a timer depending on the transmission of the DRX disable information (502) and locally activate the DRX configuration in the Rx-UE 1B depending on the expiration of said timer. Similarly, the Tx-UE 1A may start a timer depending on the receipt of the DRX disable information (502) and locally activate the DRX configuration in the Tx-UE 1A depending on the expiration of said timer.

The DRX disable information (502) may contain additional information (e.g., cause value) to inform the Tx-UE 1A why the DRX operation is temporarily suspended (or the valid DRX configuration is temporarily disabled). For example, the additional information may indicate whether the reason for suspending the DRX operation is that the Rx-UE 1B cannot (or does not need to) perform DRX in order to perform many sidelink receptions, or for some other reason. The Tx-UE 1A may determine whether the valid DRX configuration needs to be reconfigured, redetermined, or renegotiated based on the reason indicated by the additional information.

Figure 6:
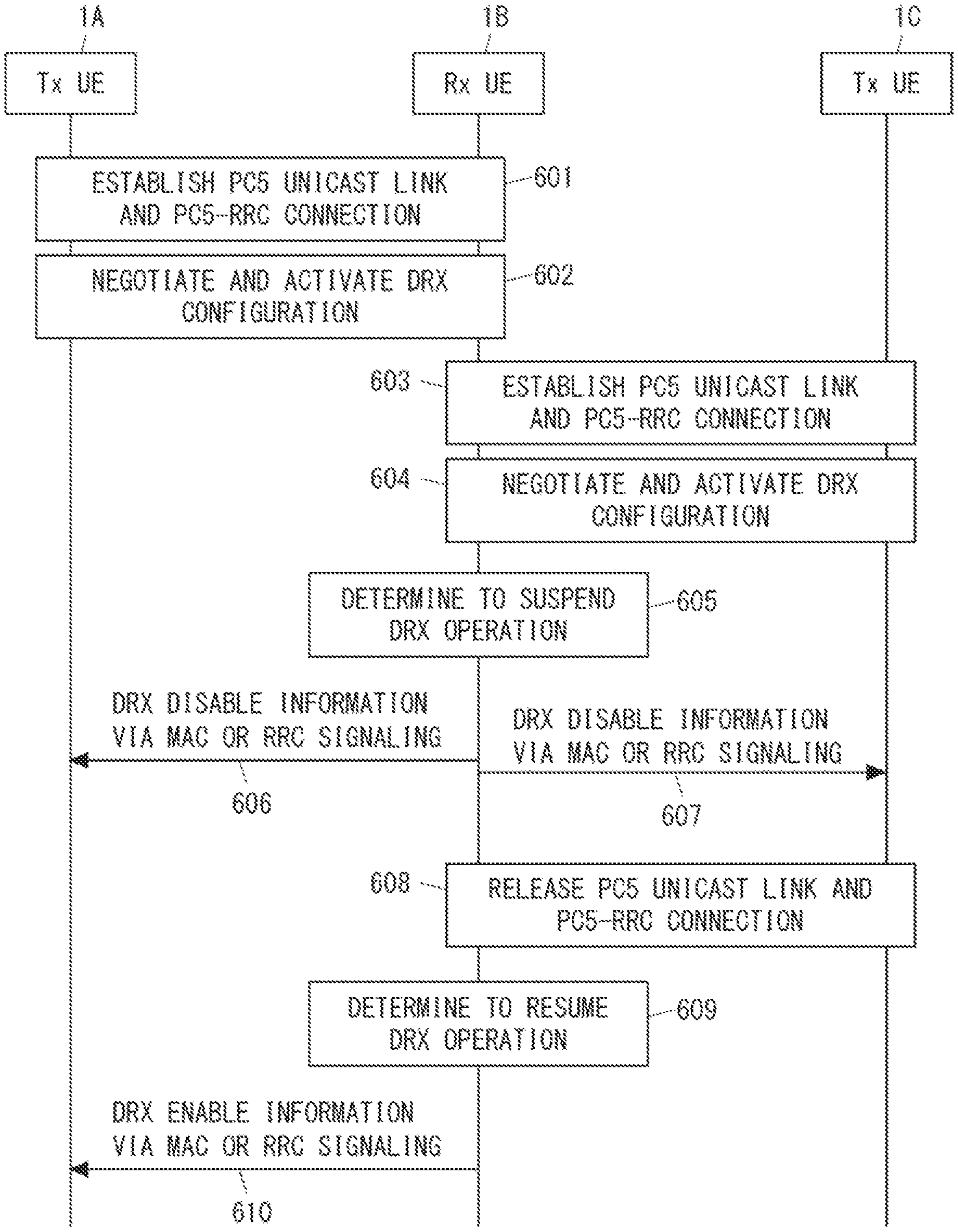
FIG. 6 shows an example of signaling between UEs according to an example embodiment.

FIG. 6 shows an example where the Rx-UE 1B receives multiple sidelink unicast communications. In step 601, the Tx-UE 1A and the Rx-UE 1B establish a PC5 unicast link and establish (or consider as established) a corresponding PC5-RRC connection. In step 602, the Tx-UE 1A and the Rx-UE 1B negotiate and initially activate DRX using signaling on the PC5-RRC connection. The Tx-UE 1A then performs a unicast transmission to the Rx-UE 1B according to the valid DRX configuration for that unicast transmission. The Rx-UE 1B receives the unicast transmission from the Tx-UE 1A according to the valid DRX configuration.

In step 603, the Rx-UE 1B establishes a PC5 unicast link with another Tx-UE 1C and establishes (or considers as established) a corresponding PC5-RRC connection. In step 604, the Tx-UE 1C and the Rx-UE 1B negotiate and initially activate DRX using signaling on the PC5-RRC connection.

In step 605, the Rx-UE 1B determines to temporarily suspend its DRX operation. For example, the Rx-UE 1B may temporarily suspend the DRX operation when it is appropriate for the Rx-UE 1B to perform continuous reception to receive multiple sidelink communications, including the unicast communications from the Tx-UE 1A and the Tx-UE 1C, respectively. In steps 606 and 607, the Rx-UE 1B transmits DRX disable information to the Tx-UE 1A and Tx-UE 1C. The order of steps 606 and 607 is not restricted.

In step 608, the Rx-UE 1B releases the PC5 unicast link and PC5-RRC connection with the Tx-UE 1C. In step 609, the Rx-UE 1B decides to resume its DRX operation. For example, the Rx-UE 1B may resume the DRX operation if it is appropriate for the Rx-UE 1B to perform DRX in order to receive one or more sidelink communications, including the unicast communications from the Tx-UE 1A. In step 610, the Rx-UE 1B sends DRX enable information to the Tx-UE 1A. Note that the PC5 unicast link and the PC5-RRC connection may not be released in step 608. For example, the Rx-UE 1B may perform the action in step 610 in response to determining that it is appropriate to perform DRX due to a change in the DRX configuration of the Rx-UE 1B for receiving the unicast transmission from the Tx-UE 1C.

Figure 7:
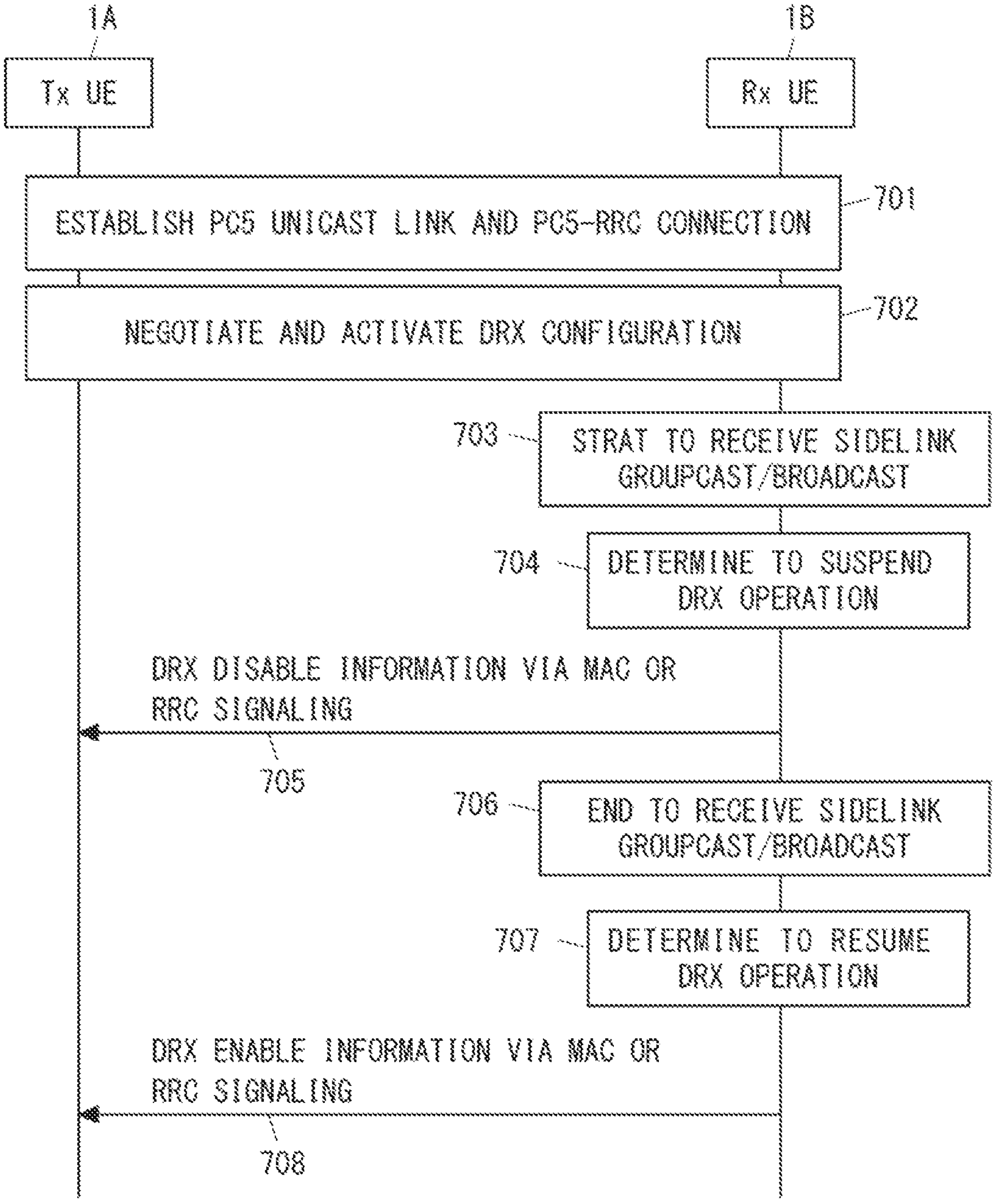
FIG. 7 shows an example of signaling between UEs according to an example embodiment.

FIG. 7 shows an example where the Rx-UE 1B receives sidelink broadcast or sidelink groupcast in addition to performing sidelink unicast communication. Steps 701 and 702 are similar to steps 601 and 602 in FIG. 6.

In step 703, the Rx-UE 1B starts to receive sidelink broadcast or sidelink groupcast.

In step 704, the Rx-UE 1B decides to temporarily suspend its DRX operation. For example, the Rx-UE 1B may temporarily suspend the DRX operation when it is appropriate for the Rx-UE 1B to perform continuous reception to receive multiple sidelink communications, including the sidelink unicast from the Tx-UE 1A and the sidelink broadcast (or broadcast). In step 705, the Rx-UE 1B sends DRX disable information to the Tx-UE 1A.

In step 706, the Rx-UE 1B terminates the reception of the sidelink broadcast or sidelink groupcast. In step 707, the Rx-UE 1B decides to resume its DRX operation. For example, the Rx-UE 1B may resume the DRX operation when it is appropriate for the Rx-UE 1B to perform DRX to receive one or more sidelink communications, including the unicast communication from the Tx-UE 1A. In step 708, the Rx-UE 1B sends DRX enable information to the Tx-UE 1A.

Second Example Embodiment

This embodiment describes a modification of the DRX-related signaling described in the first example embodiment. The example of the radio communication system according to this example embodiment is the same as the example described with reference to FIG. 1.

Figure 8:
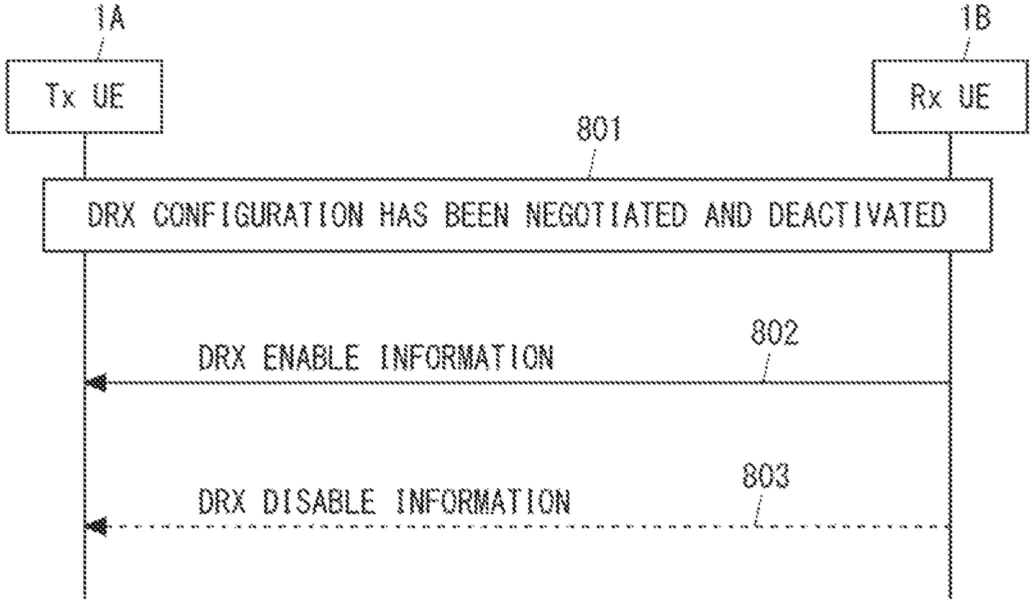
FIG. 8 shows an example of signaling between UEs according to an example embodiment.

The following describes a specific example of signaling related to DRX performed by the UE 1B to receive a unicast communication (transmission) sent by the UE 1A, with reference to FIG. 8. For ease of explanation, the UE 1A will be referred to as the transmitting UE (Tx-UE) and the UE 1B will be referred to as the receiving UE (Rx-UE). As already explained, the PC5 unicast link is bidirectional, so that the UE 1B can also send user data and signaling to the UE 1A over this PC5 unicast link. Therefore, the signaling and operation described below can also be used for DRX performed by the UE 1A to receive a unicast communication (transmission) sent by the UE 1B.

In step 801, similar to step 501 in FIG. 5, the Tx-UE 1A and the Rx-UE 1B negotiate a DRX configuration for the Rx-UE 1B to receive a unicast communication from the UE 1A. The Tx-UE 1A and the Rx-UE 1B may perform the negotiation (or determination) of the DRX configuration via RRC layer signaling (e.g., PC5 RRC messages). This negotiation (or determination) of the DRX configuration may be performed in a Tx-UE centric manner or in an Rx-UE centric manner.

However, in step 801, in contrast to the behavior in step 501, after negotiating the DRX configuration, the Tx-UE 1A and the Rx-UE 1B initially deactivate this valid DRX configuration. Deactivating the DRX configuration can be paraphrased as disabling the DRX configuration or turning off the DRX configuration. Accordingly, the Rx-UE 1B has the valid DRX configuration but does not initiate the DRX operation based on this DRX configuration. The Tx-UE 1A recognizes that the Rx-UE 1B has the valid DRX configuration but has not yet initiated the DRX operation.

In step 802, the Rx-UE 1B indicates, while the DRX configuration for the unicast transmission from the Tx-UE 1A has been negotiated and is valid, whether or not the Rx-UE 1B performs the DRX operation based on this valid DRX configuration to receive this unicast communication from the Tx-UE 1A. Specifically, in the example shown in FIG. 8, the Rx-UE 1B sends DRX enable information to the Tx-UE 1A indicating that the DRX operation for the unicast communication based on the valid DRX configuration is to be initiated. The DRX enable information may be paraphrased as, for example, DRX activation information, DRX ON information, or DRX resumption information.

In response to the transmission of the DRX enable information (802), the Rx-UE 1B activates the valid DRX configuration and receives the unicast transmission from the Tx-UE 1A according to the valid DRX configuration. Meanwhile, upon receipt of the DRX enable information (802), the Tx-UE 1A performs the unicast transmission to the Rx-UE 1B according to the valid DRX configuration for that unicast transmission.

The transmission of the DRX enable information (802) and the operation of the Tx-UE 1A and Rx-UE 1B based on this information can provide the following benefits. After receiving the DRX enable information (802), the Tx-UE 1A performs the unicast transmission to the Rx-UE 1B according to the valid DRX configuration for this unicast transmission. In other words, the Tx-UE 1A does not recognize that the Rx-UE 1B is performing the DRX operation unless the Tx-UE 1A receives the DRX enable information (802) from the Rx-UE 1B. This may allow the Tx-UE 1A and the Rx-UE 1B to successfully perform sidelink unicast communication if the Tx-UE 1A supports sidelink DRX operation but the Rx-UE 1B does not.

As shown in step 803 of FIG. 8, after sending the DRX enable information (802), the Rx-UE 1B may, if necessary, send DRX disable information to the Tx-UE 1A indicating that the DRX operation based on the valid DRX configuration is temporarily suspended. The behavior of the Tx-UE 1A and Rx-UE 1B after the transmission of the DRX disable information (803) may be the same as the behavior of the Tx-UE 1A and Rx-UE 1B after the transmission of the DRX disable information in step 502 of FIG. 5.

In some implementations, the DRX disable information (803) need not be sent. For example, the Rx-UE 1B may continue the DRX operation based on the valid DRX configuration until the DRX configuration is invalidated or released by signaling between the Tx-UE 1A and the Rx-UE 1B for reconfiguring the PC5 RRC connection.

Third Example Embodiment

This embodiment describes a modification of the DRX-related signaling described in the first example embodiment. The example of the radio communication system according to this example embodiment is the same as the example described with reference to FIG. 1.

Figure 9:
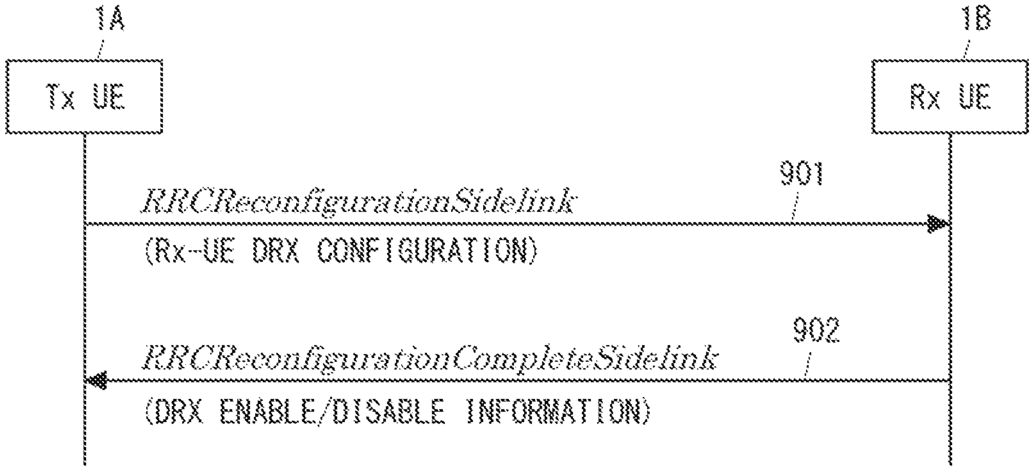
FIG. 9 shows an example of signaling between UEs according to an example embodiment.

FIG. 9 shows an example of the signaling involved in the procedure where the Tx-UE 1A and the Rx-UE 1B negotiate a DRX configuration for the reception by the Rx-UE 1B of a unicast communication from the UE 1A. The signaling shown in FIG. 9 relates to the Tx-UE centric DRX configuration negotiation (or determination). In step 901, the Tx-UE 1A finalizes the DRX configuration and transmits it to the Rx-UE 1B. For example, as shown in FIG. 9, the Tx-UE 1A may send the DRX configuration using an RRCReconfigurationSidelink message. Prior to step 901, the Rx-UE 1B may send assistance information to the Tx-UE 1A. The Tx-UE 1A may make the final decision on the DRX configuration taking into account the assistance information received. The assistance information may include, for example, information on power savings, e.g., one or both of preferences and constraints. The assistance information may include the current DRX configurations for one or more other SL connections.

In step 902, the Rx-UE 1B decides to accept (or comply with) the configuration (including the DRX configuration) contained in the RRC message (e.g., RRCReconfigurationSidelink message) received in step 901. The Rx-UE 1B then responds to the Tx-UE 1A with an acceptance response. In particular, the Rx-UE 1B may send an RRCReconfigurationCompleteSidelink message to the Tx-UE 1A.

The message of step 902 indicates to the Tx-UE 1A whether or not the Rx-UE 1B will perform the DRX operation based on the DRX configuration received in step 901 in order to receive the corresponding unicast transmission from the Tx-UE 1A. For example, if the Rx-UE 1B performs the DRX operation based on the DRX configuration, the Rx-UE 1B may include DRX enable information in the message of step 902. Alternatively, if the Rx-UE 1B performs the DRX operation based on the DRX configuration, the Rx-UE 1B may not include DRX disable information in the message of step 902. On the other hand, if the Rx-UE 1B does not perform the DRX operation based on the DRX configuration, the Rx-UE 1B may include DRX disable information in the message of step 902. Alternatively, if the Rx-UE 1B does not perform the DRX operation based on the DRX configuration, the Rx-UE 1B may not include DRX enable information in the message of step 902.

If the message of step 902 indicates that the DRX operation is to be performed, the Tx-UE 1A performs the unicast transmission to the Rx-UE 1B according to the valid DRX configuration for this unicast transmission. The Rx-UE 1B receives the unicast transmission from the Tx-UE 1A according to the valid DRX configuration. Conversely, if the message of step 902 indicates that the DRX operation is not to be performed, the Rx-UE 1B has the valid DRX configuration but does not initiate the DRX operation based on that DRX configuration. The Tx-UE 1A recognizes that the Rx-UE 1B has the valid DRX configuration but has not yet initiated the DRX operation.

The signaling shown in FIG. 9 allows the Rx-UE 1B to determine whether a valid DRX configuration negotiated with the Tx-UE 1A is to be initially activated or deactivated, and to inform the Tx-UE 1A of its decision.

Fourth Example Embodiment

This embodiment describes a modification of the DRX-related signaling described in the first example embodiment. The example of the radio communication system according to this example embodiment is the same as the example described with reference to FIG. 1.

Figure 10:
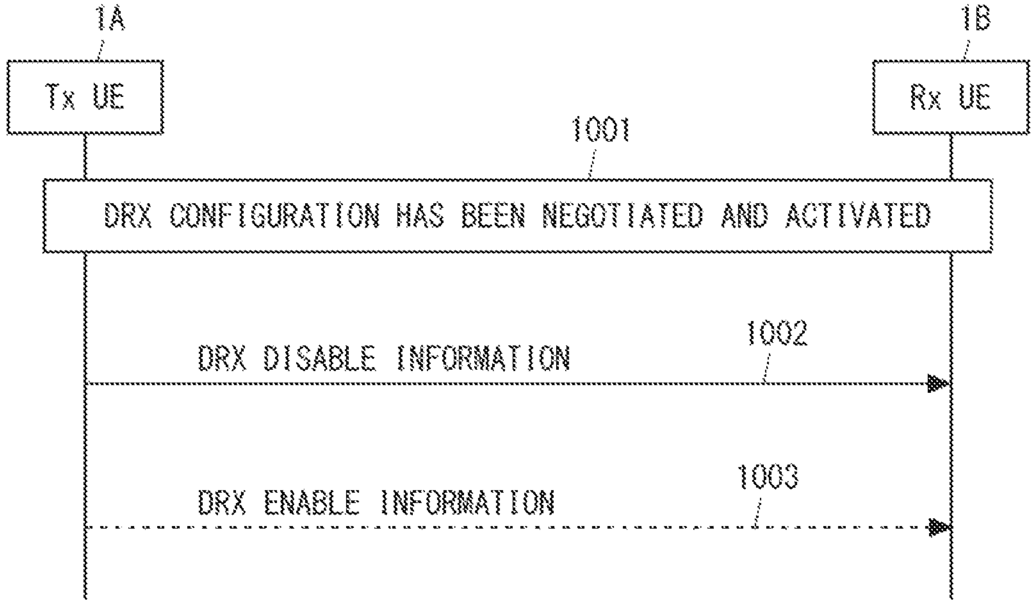
FIG. 10 shows an example of signaling between UEs according to an example embodiment.

The following describes a specific example of signaling related to DRX performed by the UE 1B to receive a unicast communication (transmission) sent by the UE 1A, with reference to FIG. 10. For ease of explanation, the UE 1A will be referred to as the transmitting UE (Tx-UE) and the UE 1B will be referred to as the receiving UE (Rx-UE). As already explained, the PC5 unicast link is bidirectional, so that the UE 1B can also send user data and signaling to the UE 1A over this PC5 unicast link. Therefore, the signaling and operation described below can also be used for DRX performed by the UE 1A to receive a unicast communication (transmission) sent by the UE 1B.

Step 1001 is similar to step 501 in FIG. 5. Specifically, the DRX configuration is negotiated and initially activated.

In step 1001, while the DRX configuration for the unicast transmission from the Tx-UE 1A has been negotiated and is valid, the Tx-UE 1A indicates, if necessary, whether or not the Rx-UE 1B is allowed to perform the DRX operation based on this valid DRX configuration to receive this unicast communication from the Tx-UE 1A. In other words, the Rx-UE 1B receives from the Tx-UE 1A, while the DRX configuration for the unicast transmission from the Tx-UE 1A has been negotiated and is valid, information indicating whether or not the Rx-UE 1B is allowed to perform DRX operations based on such valid DRX configuration.

Specifically, in the example shown in FIG. 10, the Tx-UE 1A sends DRX disable information to the Rx-UE 1B indicating that the DRX operation for the unicast communication based on the valid DRX configuration needs to be temporarily suspended. DRX disable information can be paraphrased as, for example, DRX deactivation information, DRX OFF information, DRX suspension information, or DRX pause information.

In response to the transmission of the DRX disable information (1002), the Tx-UE 1A recognizes that the Rx-UE 1B will not perform the DRX operation based on the valid DRX configuration, but will perform a continuous receive operation. Meanwhile, the Rx-UE TB temporarily stops (or suspends, pauses) the DRX operation for the unicast transmission from the Tx-UE 1A in response to receiving the DRX disable information (1002). In other words, the Rx-UE 1B attempts to receive on radio resources (e.g., subframes, subchannels, resource blocks) that could be used for the unicast transmission from the Tx-UE 1A, even during the OFF duration of the valid DRX configuration.

In an example, after sending the DRX disable information (1002), the Tx-UE 1A may transmit to the Rx-UE 1B even during the OFF duration of the valid DRX configuration. This could contribute to increasing the transmission opportunities for the Tx-UE 1A.

As shown in step 1003 of FIG. 10, after sending the DRX disable information (1002), the Tx-UE 1A may, if necessary, send DRX enable information to the Rx-UE 1B indicating that the DRX operation based on the valid DRX configuration is to be resumed. The DRX enable information may be paraphrased as, for example, DRX activation information, DRX ON information, or DRX resumption information.

In some implementations, the transmission of the DRX enable information (1003) may be omitted. For example, the Tx-UE 1A may start a timer depending on the transmission of the DRX disable information (1002) and locally activate the DRX configuration in the Tx-UE 1A depending on the expiration of said timer. Similarly, the Rx-UE 1B may start a timer depending on the receipt of the DRX disable information (1002) and locally activate the DRX configuration in the Rx-UE 1B depending on the expiration of said timer.

The DRX disable information (1002) may contain additional information (e.g., cause value) to inform the Rx-UE 1B why the DRX operation is temporarily suspended (or the valid DRX configuration is temporarily disabled). In an example, the additional information may indicate whether the reason for suspending the DRX operation is because urgent information needs to be transmitted or for some other reason.

Fifth Example Embodiment

This embodiment describes a modification of the DRX-related signaling described in the first example embodiment. The example of the radio communication system according to this example embodiment is the same as the example described with reference to FIG. 1.

Figure 11:
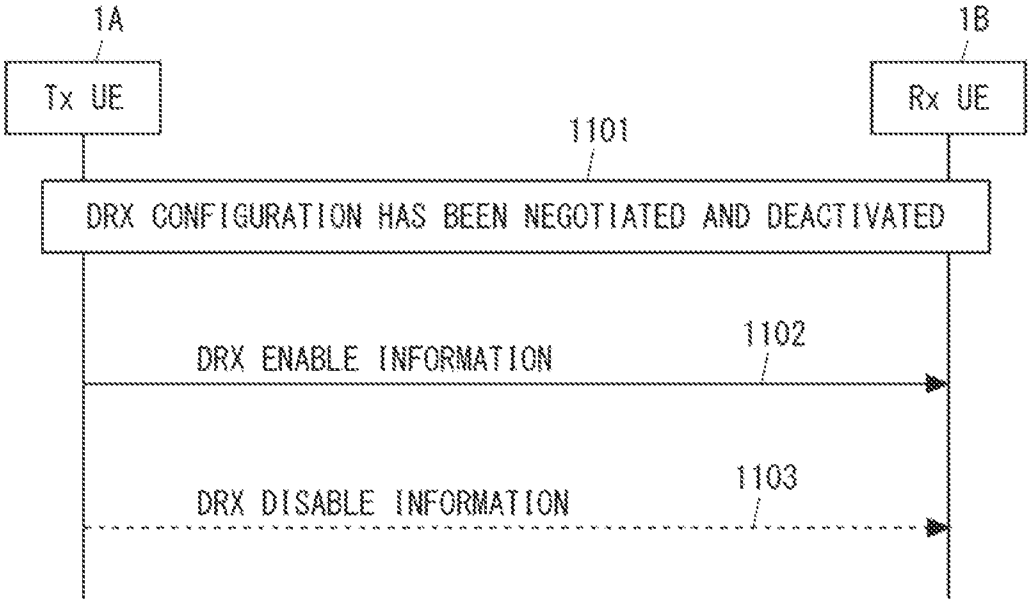
FIG. 11 shows an example of signaling between UEs according to an example embodiment.

The following describes a specific example of signaling related to DRX performed by the UE 1B to receive a unicast communication (transmission) sent by the UE 1A, with reference to FIG. 11. For ease of explanation, the UE 1A will be referred to as the transmitting UE (Tx-UE) and the UE 1B will be referred to as the receiving UE (Rx-UE). As already explained, the PC5 unicast link is bidirectional, so that the UE 1B can also send user data and signaling to the UE 1A over this PC5 unicast link. Therefore, the signaling and operation described below can also be used for DRX performed by the UE 1A to receive a unicast communication (transmission) sent by the UE 1B.

Step 1101 is similar to step 801 in FIG. 8. Specifically, the DRX configuration is negotiated and initially deactivated.

In step 1102, while the DRX configuration for the unicast transmission from the Tx-UE 1A has been negotiated and is valid, the Tx-UE 1A indicates whether or not the Rx-UE 1B is allowed to perform the DRX operation based on this valid DRX configuration to receive this unicast communication from the Tx-UE 1A. Specifically, in the example shown in FIG. 11, the Tx-UE 1A sends DRX enable information to the Rx-UE 1B indicating that the Rx-UE 1B is allowed to perform the DRX operation based on the valid DRX configuration. The DRX enable information may be paraphrased as, for example, DRX activation information, DRX ON information, or DRX resumption information.

In response to sending the DRX enable information (1102), the Tx-UE 1A performs the unicast transmission to the Rx-UE 1B according to the valid DRX configuration for this unicast transmission. Meanwhile, the Rx-UE 1B activates the valid DRX configuration and receives the unicast transmission from the Tx-UE 1A according to this valid DRX configuration.

The transmission of the DRX enable information (1102) and the operation of the Tx-UE 1A and Rx-UE 1B based on this information can provide the following benefits. After receiving the DRX enable information (1102), the Rx-UE 1B receives the unicast transmission from the Tx-UE 1A according to the valid DRX configuration for that unicast transmission. In other words, the Rx-UE 1B does not perform DRX to receive the unicast transmission from the Tx-UE 1A unless the Rx-UE 1B receives the DRX enable information (1102) from the Tx-UE 1A. This may allow the Tx-UE 1A and the Rx-UE 1B to successfully perform sidelink unicast communication if the Rx-UE 1B supports sidelink DRX operation but the Tx-UE 1A does not.

As shown in step 1103 of FIG. 11, after sending the DRX enable information (1102), the Tx-UE 1A may, if necessary, send DRX disable information to the Rx-UE 1B indicating that the DRX operation based on the valid DRX configuration needs to be temporarily suspended. The behavior of the Tx-UE 1A and Rx-UE 1B after the transmission of the DRX disable information (1103) may be the same as the behavior of the Tx-UE 1A and Rx-UE 1B after the transmission of the DRX disable information in step 1002 of FIG. 10.

In some implementations, the DRX disable information (1103) need not be sent. For example, the Rx-UE 1B may continue the DRX operation based on the valid DRX configuration until the DRX configuration is invalidated or released by signaling between the Tx-UE 1A and the Rx-UE TB for reconfiguring the PC5 RRC connection.

Figure 12:
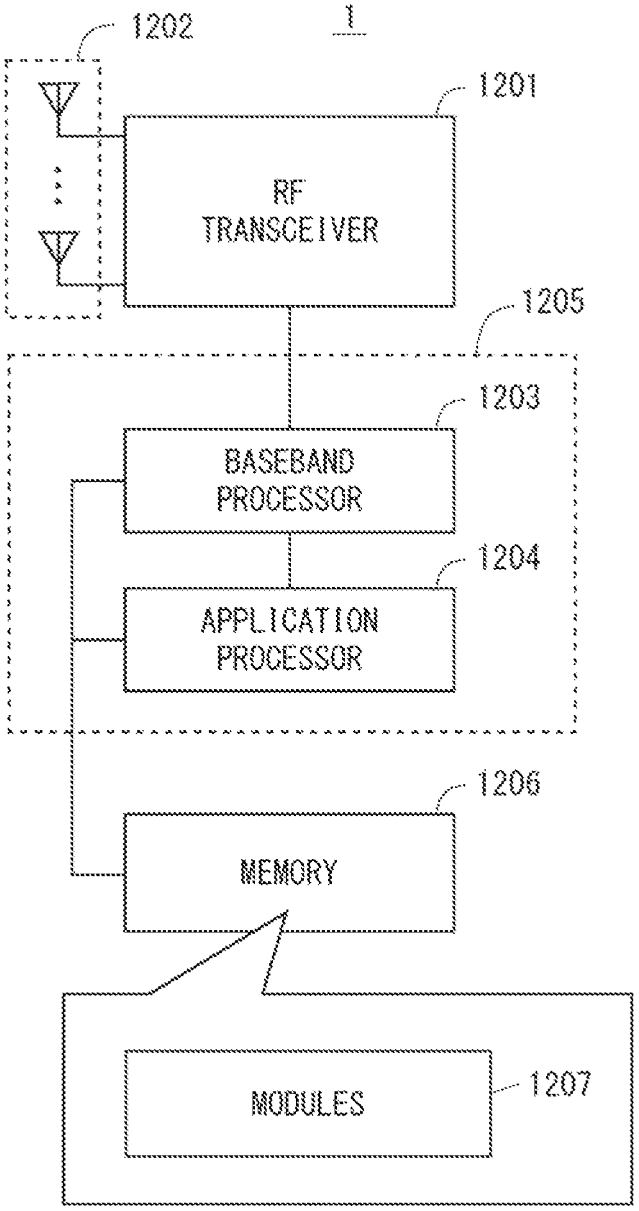
FIG. 12 is a block diagram showing an example configuration of a UE according to an example embodiment.

The following provides configuration examples of the UE 1 according to the above described example embodiments. FIG. 12 is a block diagram showing an example configuration of the UE 1. Both the UE 1A as the Tx-UE and the UE 1B as the Rx-UE described above may have the configuration shown in FIG. 12. The radio frequency (RF) transceiver 1201 performs analog RF signal processing to communicate with a RAN node. The RF transceiver 1201 may include a plurality of transceivers. The analog RF signal processing performed by the RF transceiver 1201 includes frequency up-conversion, frequency down-conversion, and amplification. The RF transceiver 1201 is coupled to the antenna array 1202 and the baseband processor 1203. The RF transceiver 1201 receives modulation symbol data (or OFDM symbol data) from the baseband processor 1203, generates a transmission RF signal, and supplies the transmission RF signal to the antenna array 1202. The RF transceiver 1201 generates a baseband reception signal based on the reception RF signal received by the antenna array 1202 and supplies the baseband reception signal to the baseband processor 1203. The RF transceiver 1201 may include an analog beamformer circuit for beamforming. The analog beamformer circuit includes, for example, a plurality of phase shifters and a plurality of power amplifiers.

The baseband processor 1203 performs digital baseband signal processing (data-plane processing) and control-plane processing for wireless communication. The digital baseband signal processing includes (a) data compression/decompression, (b) data segmentation/concatenation, (c) transmission format (transmission frame) composition/decomposition, (d) channel encoding/decoding, (e) modulation (i.e., symbol mapping)/demodulation, and (f) Inverse Fast Fourier Transform (IFFT) generation of OFDM symbol data (baseband OFDM signal). On the other hand, the control-plane processing includes communication management of layer 1 (e.g., transmission power control), layer 2 (e.g., radio resource management, and hybrid automatic repeat request (HARQ) processing), and layer 3 (e.g., signaling regarding attachment, mobility, and call management).

For example, the digital baseband signal processing performed by the baseband processor 1203 may include signal processing in the Service Data Adaptation Protocol (SDAP) layer, Packet Data Convergence Protocol (PDCP) layer, Radio Link Control (RLC) layer, Medium Access Control (MAC) layer, and Physical (PHY) layer. The control-plane processing performed by the baseband processor 1203 may also include processing of Non-Access Stratum (NAS) protocols, Radio Resource Control (RRC) protocols, MAC Control Elements (CEs), and Downlink Control Information (DCIs).

The baseband processor 1203 may perform Multiple Input Multiple Output (MIMO) encoding and precoding for beamforming.

The baseband processor 1203 may include a modem processor (e.g., Digital Signal Processor (DSP)) that performs the digital baseband signal processing and a protocol stack processor (e.g., Central Processing Unit (CPU) or Micro Processing Unit (MPU)) that performs the control-plane processing. In this case, the protocol stack processor performing the control-plane processing may be integrated with an application processor 1204 described later.

The application processor 1204 may also be referred to as a CPU, an MPU, a microprocessor, or a processor core. The application processor 1204 may include a plurality of processors (processor cores). The application processor 1204 loads a system software program (Operating System (OS)) and various application programs (e.g., a voice call application, a web browser, a mailer, a camera operation application, a music player application) from a memory 1206 or from another memory (not shown) and executes these programs, thereby providing various functions of the UE 1.

In some implementations, as represented by the dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. A SoC device may be referred to as a system Large Scale Integration (LSI) or a chipset.

The memory 1206 is a volatile memory or a non-volatile memory, or a combination thereof. The memory 1206 may include a plurality of physically independent memory devices. The volatile memory is, for example, Static Random Access Memory (SRAM), Dynamic RAM (DRAM), or a combination thereof. The non-volatile memory may be a Mask Read Only Memory (MROM), an Electrically Erasable Programmable ROM (EEPROM), a flash memory, a hard disk drive, or any combination thereof. The memory 1206 may include, for example, an external memory device that can be accessed by the baseband processor 1203, the application processor 1204, or the SoC 1205. The memory 1206 may include an internal memory device that is integrated into the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data for processing by the UE 1 described in the above example embodiments. In some implementations, the baseband processor 1203 or the application processor 1204 may load the software module(s) 1207 from the memory 1206 and execute the loaded software module(s) 1207, thereby performing the processing of the UE 1 described in the above example embodiments with reference to the drawings.

The control-plane processing and operations performed by the UE 1 described in the above embodiments can be achieved by elements other than the RF transceiver 1201 and the antenna array 1202, i.e., achieved by the memory 1206, which stores the software modules 1207, and one or both of the baseband processor 1203 and the application processor 1204.

As described using FIG. 12, the one or more processors of the UE 1 according to the example embodiments described above can execute one or more programs, containing a set of instructions, to cause a computer to perform an algorithm described with reference to the drawings. Each of these programs contains a set of instructions (or software codes) that, when loaded into a computer, causes the computer to perform one or more of the functions described in the example embodiments. Each of these programs may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. Each program may be transmitted on a transitory computer readable medium or a communication medium. By way of example, and not limitation, transitory computer readable media or communication media can include electrical, optical, acoustical, or other form of propagated signals.

The above-described example embodiments are merely examples of applications of the technical ideas obtained by the inventors. These technical ideas are not limited to the above-described example embodiments and various modifications can be made thereto.

For example, the whole or part of the example embodiments disclosed above can be described as, but not limited to, the following supplementary notes.

Supplementary Note 1

A radio terminal comprising:

at least one radio transceiver; and at least one processor coupled to the at least one radio transceiver and configured to:

negotiate a discontinuous reception (DRX) configuration with a peer terminal for reception by the radio terminal of a unicast communication on a direct interface between the radio terminal and the peer terminal; and indicate to the peer terminal, while the DRX configuration has been negotiated and is valid, whether or not the radio terminal performs a DRX operation based on the valid DRX configuration in order to receive the unicast communication.

Supplementary Note 2

The radio terminal according to Supplementary Note 1, wherein the DRX operation based on the valid DRX configuration is initially activated, and the at least one processor is configured to send disable information to the peer terminal indicating that the DRX operation based on the valid DRX configuration is temporarily suspended.

Supplementary Note 3

The radio terminal according to Supplementary Note 2, wherein the at least one processor is configured to:

manage a plurality of valid DRX configurations for respective receptions of a plurality of sidelink communications, including the unicast communication; and send the disable information to the peer terminal when the radio terminal is substantially unable or unnecessary to perform the DRX operation considering the plurality of valid DRX configurations.

Supplementary Note 4

The radio terminal according to Supplementary Note 2 or 3, wherein the at least one processor is configured to send to the peer terminal enable information indicating that the DRX operation based on the valid DRX configuration is to be resumed, if necessary, after sending the disable information.

Supplementary Note 5

The radio terminal according to Supplementary Note 1, wherein the DRX operation based on the valid DRX configuration is initially deactivated, and the at least one processor is configured to send enable information to the peer terminal indicating that the DRX operation based on the valid DRX configuration is to be initiated.

Supplementary Note 6

The radio terminal according to Supplementary Note 5, wherein the at least one processor is configured to send to the peer terminal disable information indicating that the DRX operation based on the valid DRX configuration is temporarily suspended, if necessary, after sending the enable information.

Supplementary Note 7

The radio terminal according to any one of Supplementary Notes 1 to 6, wherein the at least one processor is configured to:

negotiate the DRX configuration with the peer terminal via Radio Resource Control (RRC) layer signaling; and
send information indicating whether or not the radio terminal performs the DRX operation based on the valid DRX configuration, to the peer terminal via RRC layer signaling.

Supplementary Note 8

The radio terminal according to any one of Supplementary Notes 1 to 6, wherein the at least one processor is configured to:
negotiate the DRX configuration with the peer terminal via Radio Resource Control (RRC) layer signaling; and
send information indicating whether or not the radio terminal performs the DRX operation based on the valid DRX configuration, to the peer terminal via Medium Access Control (MAC) layer signaling.

Supplementary Note 9

A radio terminal comprising:
at least one radio transceiver; and
at least one processor coupled to the at least one radio transceiver and configured to:
negotiate a discontinuous reception (DRX) configuration with a peer terminal for reception by the peer terminal of a unicast communication on a direct interface between the radio terminal and the peer terminal; and
receive from the peer terminal, while the DRX configuration has been negotiated and is valid, first information indicating whether or not the peer terminal performs a DRX operation based on the valid DRX configuration to receive the unicast communication.

Supplementary Note 10

The radio terminal according to Supplementary Note 9, wherein
the DRX operation based on the valid DRX configuration is initially activated, and
the at least one processor is configured to recognize that the peer terminal does not perform the DRX operation based on the valid DRX configuration but performs a continuous reception operation, if the first information indicates that the DRX operation based on the valid DRX configuration is temporarily suspended.

Supplementary Note 11

The radio terminal according to Supplementary Note 9, wherein
the DRX operation based on the valid DRX configuration is initially deactivated, and
the at least one processor is configured to perform transmission with respect to the unicast communication, while taking into account the valid DRX configuration, if the first information indicates that the DRX operation based on the valid DRX configuration is to be initiated.

Supplementary Note 12

The radio terminal according to any one of Supplementary Notes 9 to 11, wherein the at least one processor is configured to:
negotiate the DRX configuration with the peer terminal via Radio Resource Control (RRC) layer signaling; and
receive the first information from the peer terminal via RRC layer signaling.

Supplementary Note 13

The radio terminal according to any one of Supplementary Notes 9 to 11, wherein the at least one processor is configured to:
negotiate the DRX configuration with the peer terminal via Radio Resource Control (RRC) layer signaling; and
receive the first information from the peer terminal via Medium Access Control (MAC) layer signaling.

Supplementary Note 14

A method performed by a radio terminal, the method comprising:
negotiating a discontinuous reception (DRX) configuration with a peer terminal for reception by the radio terminal of a unicast communication on a direct interface between the radio terminal and the peer terminal; and
indicating to the peer terminal, while the DRX configuration has been negotiated and is valid, whether or not the radio terminal performs a DRX operation based on the valid DRX configuration in order to receive the unicast communication.

Supplementary Note 15

A method performed by a radio terminal, the method comprising:
negotiating a discontinuous reception (DRX) configuration with a peer terminal for reception by the peer terminal of a unicast communication on a direct interface between the radio terminal and the peer terminal; and
receiving from the peer terminal, while the DRX configuration has been negotiated and is valid, first information indicating whether or not the peer terminal performs a DRX operation based on the valid DRX configuration to receive the unicast communication.

Supplementary Note 16

A program for causing a computer to perform a method for a radio terminal, the method comprising:
negotiating a discontinuous reception (DRX) configuration with a peer terminal for reception by the radio terminal of a unicast communication on a direct interface between the radio terminal and the peer terminal; and
indicating to the peer terminal, while the DRX configuration has been negotiated and is valid, whether or not the radio terminal performs a DRX operation based on the valid DRX configuration in order to receive the unicast communication.

Supplementary Note 17

A program for causing a computer to perform a method for a radio terminal, the method comprising:
negotiating a discontinuous reception (DRX) configuration with a peer terminal for reception by the peer terminal of a unicast communication on a direct interface between the radio terminal and the peer terminal; and receiving from the peer terminal, while the DRX configuration has been negotiated and is valid, first information indicating whether or not the peer terminal performs a DRX operation based on the valid DRX configuration to receive the unicast communication.

Supplementary Note 18

A radio terminal comprising:

at least one radio transceiver; and at least one processor coupled to the at least one radio transceiver and configured to:

negotiate a discontinuous reception (DRX) configuration with a peer terminal for reception by the radio terminal of a unicast communication on a direct interface between the radio terminal and the peer terminal; and receive from the peer terminal, while the DRX configuration has been negotiated and is valid, first information indicating whether or not the radio terminal is allowed to perform a DRX operation based on the valid DRX configuration in order to receive the unicast communication.

Supplementary Note 19

The radio terminal according to Supplementary Note 18, wherein the DRX operation based on the valid DRX configuration is initially activated, and the at least one processor is configured to perform a continuous reception operation without performing the DRX operation based on the valid DRX configuration, if the first information indicates that the DRX operation based on the valid DRX configuration needs to be temporarily suspended.

Supplementary Note 20

The radio terminal according to Supplementary Note 18, wherein the DRX operation based on the valid DRX configuration is initially deactivated, and the at least one processor is configured to initiate the DRX operation based on the valid DRX configuration to receive the unicast communication if the first information indicates that the radio terminal is allowed to perform the DRX operation.

Supplementary Note 21

The radio terminal according to any one of Supplementary Notes 18 to 20, wherein the at least one processor is configured to:

negotiate the DRX configuration with the peer terminal via Radio Resource Control (RRC) layer signaling; and receive the first information from the peer terminal via RRC layer signaling.

Supplementary Note 22

The radio terminal according to any one of Supplementary Notes 18 to 20, wherein the at least one processor is configured to:

negotiate the DRX configuration with the peer terminal via Radio Resource Control (RRC) layer signaling; and receive the first information from the peer terminal via Medium Access Control (MAC) layer signaling.

Supplementary Note 23

A radio terminal comprising:

at least one radio transceiver; and at least one processor coupled to the at least one radio transceiver and configured to:

negotiate a discontinuous reception (DRX) configuration with a peer terminal for reception by the peer terminal of a unicast communication on a direct interface between the radio terminal and the peer terminal; and indicate to the peer terminal, while the DRX configuration has been negotiated and is valid, whether or not the peer terminal is allowed to perform a DRX operation based on the valid DRX configuration in order to receive the unicast communication.

Supplementary Note 24

The radio terminal according to Supplementary Note 23, wherein the DRX operation based on the valid DRX configuration is initially activated, and the at least one processor is configured to send disable information to the peer terminal indicating that the DRX operation based on the valid DRX configuration needs to be temporarily suspended.

Supplementary Note 25

The radio terminal according to Supplementary Note 24, wherein the disable information causes the peer terminal to perform a continuous reception operation without performing the DRX operation based on the valid DRX configuration.

Supplementary Note 26

The radio terminal according to Supplementary Note 23, wherein the DRX operation based on the valid DRX configuration is initially deactivated, and the at least one processor is configured to send enable information to the peer terminal indicating that the DRX operation based on the valid DRX configuration is allowed.

Supplementary Note 27

The radio terminal according to Supplementary Note 26, wherein the at least one processor is configured to send disable information to the peer terminal indicating that the DRX operation based on the valid DRX configuration needs to be temporarily suspended, if necessary, after sending the enable information.

Supplementary Note 28

The radio terminal according to any one of Supplementary Notes 1 to 6, wherein the at least one processor is configured to:

negotiate the DRX configuration with the peer terminal via Radio Resource Control (RRC) layer signaling; and send information indicating whether or not the peer terminal is allowed to perform the DRX operation based on the valid DRX configuration, to the peer terminal via RRC layer signaling.

Supplementary Note 29

The radio terminal according to any one of Supplementary Notes 1 to 6, wherein the at least one processor is configured to:

negotiate the DRX configuration with the peer terminal via Radio Resource Control (RRC) layer signaling; and send information indicating whether or not the peer terminal is allowed to perform the DRX operation based on the valid DRX configuration, to the peer terminal via Medium Access Control (MAC) layer signaling.

Supplementary Note 30

A method performed by a radio terminal, the method comprising:

negotiating a discontinuous reception (DRX) configuration with a peer terminal for reception by the radio terminal of a unicast communication on a direct interface between the radio terminal and the peer terminal; and receiving from the peer terminal, while the DRX configuration has been negotiated and is valid, first information indicating whether or not the radio terminal is allowed to perform a DRX operation based on the valid DRX configuration in order to receive the unicast communication.

Supplementary Note 31

A method performed by a radio terminal, the method comprising:

negotiating a discontinuous reception (DRX) configuration with a peer terminal for reception by the peer terminal of a unicast communication on a direct interface between the radio terminal and the peer terminal; and indicating to the peer terminal, while the DRX configuration has been negotiated and is valid, whether or not the peer terminal is allowed to perform a DRX operation based on the valid DRX configuration in order to receive the unicast communication.

Supplementary Note 32

A program for causing a computer to perform a method for a radio terminal, the method comprising:

negotiating a discontinuous reception (DRX) configuration with a peer terminal for reception by the radio terminal of a unicast communication on a direct interface between the radio terminal and the peer terminal; and receiving from the peer terminal, while the DRX configuration has been negotiated and is valid, first information indicating whether or not the radio terminal is allowed to perform a DRX operation based on the valid DRX configuration in order to receive the unicast communication.

Supplementary Note 33

A program for causing a computer to perform a method for a radio terminal, the method comprising:

negotiating a discontinuous reception (DRX) configuration with a peer terminal for reception by the peer terminal of a unicast communication on a direct interface between the radio terminal and the peer terminal; and indicating to the peer terminal, while the DRX configuration has been negotiated and is valid, whether or not the peer terminal is allowed to perform a DRX operation based on the valid DRX configuration in order to receive the unicast communication.

This application is based upon and claims the benefit of priority from Japanese Patent Application No. 2021-107507, filed on Jun. 29, 2021, the disclosure of which is incorporated herein in its entirety by reference.

REFERENCE SIGNS LIST

1 UE
2 RAN node
21 Cell
103 Inter-UE direct interface
1203 Baseband processor
1204 Application processor
1206 Memory
1207 Modules

What is claimed is:

1. A method for a first terminal apparatus, the method comprising:

receiving, from a second terminal apparatus, a first message including a sidelink-related configuration including a Discontinuous Reception (DRX) configuration set by the second terminal apparatus; and transmitting, to the second terminal apparatus, a second message indicating that the first terminal apparatus applies the sidelink-related configuration, wherein the second message includes information that indicates that the first terminal apparatus rejects the DRX configuration in a case where the first terminal apparatus rejects the DRX configuration.

2. The method according to claim 1, further comprising transmitting, to the second terminal apparatus, the second message without the information that indicates that the first terminal apparatus rejects the DRX configuration if the first terminal apparatus accepts the DRX configuration.

3. A first terminal apparatus comprising:

at least one memory; and at least one processor coupled to the at least one memory and configured to:

receive, from a second terminal apparatus, a first message including a sidelink-related configuration including a Discontinuous Reception (DRX) configuration set by the second terminal apparatus; and transmit, to the second terminal apparatus, a second message indicating that the first terminal apparatus applies the sidelink-related configuration, wherein the second message includes information that indicates that the first terminal apparatus rejects the DRX configuration in a case where the first terminal apparatus rejects the DRX configuration.

4. The first terminal apparatus according to claim 3, wherein the at least one processor is configured to transmit, to the terminal apparatus, the second message without the information that indicates the first terminal apparatus rejects the DRX configuration if the first terminal apparatus accepts the DRX configuration.

5. A method for a second terminal apparatus, the method comprising:

transmitting, to a first terminal apparatus, a first message including a sidelink-related configuration including a Discontinuous Reception (DRX) configuration set by the second terminal apparatus; and receiving, from the first terminal apparatus, a second message indicating that the first terminal apparatus applies the sidelink-related configuration, wherein the second message includes information that indicates that the first terminal apparatus rejects the DRX configuration in a case where the first terminal apparatus rejects the DRX configuration.

6. The method according to claim 5, further comprising receiving, from the first terminal apparatus, the second message without the information that indicates that the first terminal apparatus rejects the DRX configuration if the first terminal apparatus accepts the DRX configuration.

* * * * *